US008220789B2

(12) United States Patent
Pourounidis et al.

(10) Patent No.: US 8,220,789 B2
(45) Date of Patent: Jul. 17, 2012

(54) COMBINATION FOOD CUTTING BOARD WITH REMOVABLE COMPARTMENTS

(76) Inventors: Harry Pourounidis, Moonee Ponds (AU); Curtis Stone, London (GB)

(*) Notice: Subject to any disclaimer, the term of this patent is extended or adjusted under 35 U.S.C. 154(b) by 920 days.

(21) Appl. No.: 12/130,916

(22) Filed: May 30, 2008

(65) Prior Publication Data

US 2008/0296823 A1 Dec. 4, 2008

(30) Foreign Application Priority Data

Jun. 1, 2007 (AU) .................................. 18239/2007

(51) Int. Cl.
*B23Q 3/00* (2006.01)

(52) U.S. Cl. ............ 269/289 R; 7/110; 83/167; 83/932; 99/537; 206/216; 241/95; 241/100; 241/101.01; 269/13; 269/15; 269/16

(58) Field of Classification Search .................... 99/537; 206/216; 269/289 R, 13, 15, 16; 241/95, 241/100, 101.01; 83/167, 932; 7/110
See application file for complete search history.

(56) References Cited

U.S. PATENT DOCUMENTS

| | | | | | |
|---|---|---|---|---|---|
| 2,609,024 | A | * | 9/1952 | Russ | 269/15 |
| 2,667,392 | A | * | 1/1954 | Sexton | 108/26 |
| 3,598,164 | A | * | 8/1971 | August | 269/13 |
| 3,785,008 | A | * | 1/1974 | Parker | 452/195 |
| 4,041,964 | A | * | 8/1977 | Shamoon | 134/115 R |
| 4,077,685 | A | * | 3/1978 | Scire et al. | 312/246 |
| 4,243,184 | A | * | 1/1981 | Wright | 241/273.2 |
| D259,166 | S | * | 5/1981 | Krusche | D7/549 |
| 4,515,421 | A | * | 5/1985 | Steffes | 312/351 |
| D283,777 | S | * | 5/1986 | Morin | D7/698 |
| 4,616,867 | A | * | 10/1986 | O'Hara | 294/180 |
| 4,653,737 | A | * | 3/1987 | Haskins et al. | 269/13 |
| 4,785,968 | A | * | 11/1988 | Logan et al. | 220/573.3 |
| 4,907,789 | A | * | 3/1990 | Tice | 269/13 |
| 4,947,991 | A | * | 8/1990 | Snell | 206/427 |
| 4,989,846 | A | * | 2/1991 | Quinn | 269/54.5 |
| D339,507 | S | * | 9/1993 | Ancona et al. | D7/698 |
| 5,312,178 | A | * | 5/1994 | King | 312/140.4 |
| 5,363,755 | A | * | 11/1994 | Liang | 99/484 |
| 5,366,208 | A | * | 11/1994 | Benjamin | 269/13 |
| 5,382,009 | A | * | 1/1995 | Mertz et al. | 269/16 |
| 5,423,451 | A | * | 6/1995 | Snyder | 220/574 |
| 5,546,852 | A | * | 8/1996 | Bidwell | 99/446 |
| 5,580,037 | A | * | 12/1996 | Gore | 269/54.5 |
| 5,626,067 | A | * | 5/1997 | Lothe | 83/761 |
| 5,865,105 | A | * | 2/1999 | Pepelanov | 99/446 |
| 5,938,185 | A | * | 8/1999 | Kletter | 269/289 R |
| 5,996,983 | A | * | 12/1999 | Laurenzi | 269/15 |

(Continued)

FOREIGN PATENT DOCUMENTS

GB 2216399 A 11/1989

*Primary Examiner* — Gene Kim
*Assistant Examiner* — Alexander Niconovich
(74) *Attorney, Agent, or Firm* — Fulwilder Patton LLP

(57) ABSTRACT

The combination food cutting board includes removable cups for food items, and a waste compartment. An upper cutting board mates with a lower base. The upper cutting board includes an aperture aligned with a receptacle in the base for waste, and secondary apertures aligned with matching receptacles in the base for holding the cups food items. The base includes a lateral opening and a sliding drawer in the waste compartment, and may include a storage compartment under the upper cutting board.

8 Claims, 1 Drawing Sheet

U.S. PATENT DOCUMENTS

| | | | |
|---|---|---|---|
| 6,026,972 | A | 2/2000 | Makowski |
| 6,182,305 | B1 * | 2/2001 | O'Connell et al. ............... 4/631 |
| 6,276,675 | B1 * | 8/2001 | Shamoon .................. 269/289 R |
| 6,371,298 | B1 | 4/2002 | Bowman |
| 6,371,470 | B1 * | 4/2002 | Ward ....................... 269/289 R |
| 6,386,531 | B1 * | 5/2002 | Prosser ........................... 269/15 |
| 6,478,293 | B1 * | 11/2002 | Keener ..................... 269/289 R |
| 6,508,368 | B1 * | 1/2003 | Arce, Jr. ....................... 211/41.3 |
| 6,536,753 | B1 * | 3/2003 | Keener ........................... 269/13 |
| 6,651,970 | B2 * | 11/2003 | Scott ......................... 269/289 R |
| 6,722,644 | B1 * | 4/2004 | Prosser ..................... 269/289 R |
| 6,745,702 | B2 * | 6/2004 | Goldberg et al. ............... 108/26 |
| 6,994,334 | B2 * | 2/2006 | Jones et al. ............... 269/289 R |
| 6,994,336 | B2 * | 2/2006 | Loo ........................... 269/302.1 |
| 7,240,380 | B2 * | 7/2007 | Erickson ........................ 4/631 |
| 7,246,387 | B2 * | 7/2007 | Erickson et al. ................. 4/631 |
| 7,252,255 | B2 * | 8/2007 | Cornfield ..................... 241/274 |
| 7,258,289 | B1 * | 8/2007 | Butt ................................ 241/30 |
| 7,290,490 | B2 * | 11/2007 | Goldberg et al. ............... 108/26 |
| 7,422,201 | B2 * | 9/2008 | Pearl et al. ................ 269/289 R |
| 7,442,118 | B2 * | 10/2008 | Edmond ....................... 452/196 |
| 7,467,590 | B1 * | 12/2008 | Meller ........................... 108/90 |
| D587,031 | S * | 2/2009 | Pourounidis et al. .......... D6/397 |
| 7,530,558 | B2 * | 5/2009 | Casale et al. ............. 269/289 R |
| 7,637,154 | B1 * | 12/2009 | Robbins .......................... 73/429 |
| 7,681,871 | B2 * | 3/2010 | Shew et al. ............... 269/289 R |
| 2001/0040328 | A1 * | 11/2001 | Keener ..................... 269/289 R |
| 2002/0185801 | A1 | 12/2002 | Cautereels et al. |
| 2002/0195763 | A1 | 12/2002 | Benjamin |
| 2003/0218290 | A1 * | 11/2003 | Goldberg et al. ......... 269/289 R |
| 2007/0001359 | A1 | 1/2007 | Pearl et al. |
| 2007/0080487 | A1 * | 4/2007 | Yartz ........................ 269/289 R |
| 2007/0108686 | A1 | 5/2007 | Casale et al. |

* cited by examiner

COMBINATION FOOD CUTTING BOARD WITH REMOVABLE COMPARTMENTS

CROSS-REFERENCES TO RELATED APPLICATIONS

This application claims priority from U.S. Design application Ser. No. 29/298,273 filed Nov. 30, 2007, which claims priority from Australian Design Application No. 18239/2007 filed on Jun. 1, 2007.

BACKGROUND OF THE INVENTION

This invention relates generally to food cutting boards, and more particularly relates to a combination food cutting board with removable compartments for receiving usable food items, and a receptacle for receiving waste materials to be discarded.

A common cutting board, such as is used as a surface for cutting food items such as vegetables, fruits, cheeses, baked goods, fish, meat and the like, typically requires the user to move cut waste materials to be discarded to a separate waste container, and to transfer cut food items to be used to a separate area or separate container for further food preparation, with both waste material and usable food items occupying space on the surface of the cutting board as food items are cut, until they are removed, often either crowding the surface of the cutting board or requiring the user to interrupt the process of food cutting to clear space on the cutting board. Removal of waste food material from the cutting board and transfer of usable food items from the cutting board is often accomplished in stages, and can be time consuming and messy. It would therefore be desirable to provide a cutting board with a built in waste receptacle for receiving waste items to be discarded, and removable receptacles for receiving usable cut food portions, so that food can be prepared quickly and cleanly on the cutting board. The present invention addresses these and other needs.

SUMMARY OF THE INVENTION

Briefly, and in general terms, the present invention provides for a combination food cutting board with removable compartments for receiving usable food items from the cutting board, and a compartment for receiving waste items. The combination food cutting board includes an upper planar cutting board that removably mates with a lower base section. The upper planar cutting board includes a primary aperture for receiving waste material to be discarded, and a plurality of secondary apertures for receiving usable food items from the cutting board. The lower base includes a primary materials receptacle registered and aligned with the primary aperture of the upper planar cutting board, for receiving waste material to be discarded, and the lower base also includes a plurality of secondary lower receptacles registered and aligned with the plurality of secondary apertures in the upper planar cutting board, respectively. A corresponding plurality of cups are removably received in the upper planar cutting board secondary apertures and the lower base secondary lower receptacles for receiving usable food items from the cutting board. In a presently preferred aspect, the cups are removably disposed in the secondary apertures of the upper planar cutting board such that the upper edges of the cups are flush with the upper cutting surface of the cutting board. In another presently preferred aspect, each of the cups includes a handle that projects above the upper cutting surface of the upper planar cutting board when the cups are received in the secondary lower receptacles of the base and the secondary apertures of the upper planar cutting board.

In another aspect, the lower base primary materials receptacle includes a lateral opening and a drawer slidably received in the base primary materials receptacle. The drawer preferably includes a handle that projects outwardly from the lower base lateral opening from the primary materials receptacle. In another aspect, the lower base may include a storage compartment that is concealed under the upper planar cutting board. In another aspect, the upper planar cutting board has a lower surface opposing the upper cutting surface of the cutting board, and the lower base includes a plurality of upwardly directed dowel pins, typically along an outer edge of the lower base, that are removably received in correspondingly downwardly directed apertures along the lower surface of the upper planar cutting board for receiving the dowel pins, for aligning and removably mating the upper planar cutting board with the lower base.

In another aspect, the plurality of cups, the plurality of secondary apertures in the upper planar cutting board, and the plurality of secondary lower receptacles in the lower base are round. The combination food cutting board may also include a scoop suited for moving cut food items into the cups and the primary materials receptacle; and the scoop and other utensils can advantageously be stored in the optional storage compartment of the lower base.

Other features and advantages of the present invention will become apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
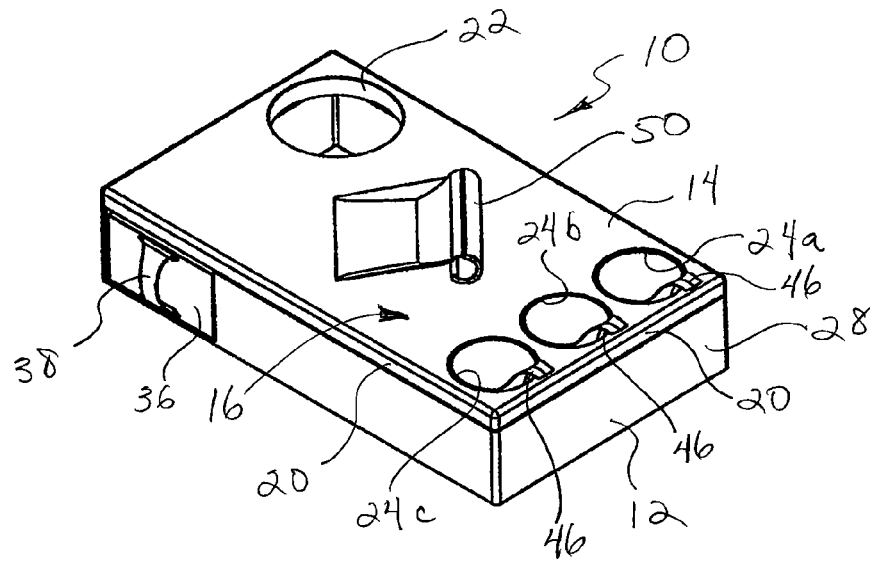
FIG. 1 is a top perspective view of the combination food cutting board of the present invention.
Figure 2:
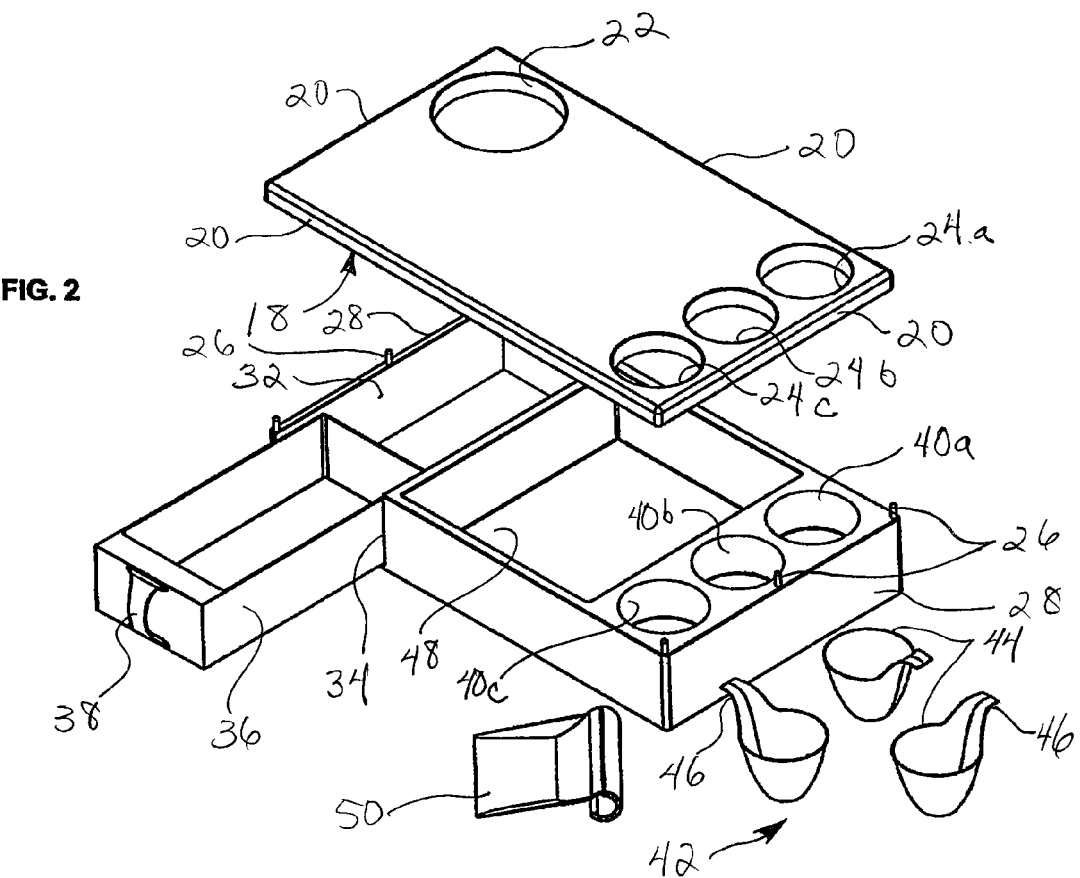
FIG. 2 is a top perspective exploded view of the combination food cutting board of FIG. 1.

As is illustrated in the drawings, the invention is embodied in a combination food cutting board 10 with removable compartments for usable food items and a compartment for receiving waste items to be discarded. The food cutting board includes a lower base 12 and an upper planar cutting board 14 configured to removably mate with the base. The upper planar cutting board includes an upper cutting surface 16, an opposing lower surface 18, and outer edges 20. The upper planar cutting board also includes a main or primary materials aperture 22 for receiving waste material to be discarded, and a plurality of secondary upper apertures 24, which are typically round, as will be explained further herein below.

The lower base typically includes a plurality of upwardly directed dowel pins 26 along at least a portion of the outer edges 28 of the lower base, and the lower surface of the upper planar cutting board preferably has a plurality of corresponding apertures (not shown) for removably receiving the upwardly directed dowel pins, for aligning and removably mating the upper planar cutting board with the lower base. Alternatively, a plurality of downwardly directed dowel pins may be provided on the lower surface of the upper planar cutting board, with corresponding apertures provided in the lower base, or other suitable means for aligning and removably mating the upper planar cutting board with the lower base may be provided.

The lower base advantageously also includes a primary materials receptacle 32 that is registered and aligned with the primary aperture of the upper cutting board for receiving waste material to be discarded. The lower base primary materials receptacle also preferably includes a lateral opening 34 for slidably receiving a drawer or bin 36, such as a rectangular tray, which is open at the top, typically having a handle 38 that projects outwardly from the lateral opening in the lower base when the drawer is inserted in the primary materials receptacle.

The lower base also preferably includes a plurality of secondary lower apertures 40, which are typically round, and which are registered and aligned with the secondary upper apertures in the upper planar cutting board and are configured to removably receive a corresponding plurality of cups 42, also typically having a corresponding rounded shape, for receiving usable cut food items. The cups have upper edges 44, and preferably rest within the secondary upper apertures and the secondary lower apertures in the base with the upper edges flush with the upper cutting surface of the upper planar cutting board, except for a handle 46 of the cups that projects above the cutting board surface, so that the cups can be readily grasped and removed as needed. The lower base also may include a storage container 48 that is open at the top for storing utensils, such as knives for example, or a scoop 50 that may be provided for scooping cut food items into the primary materials receptacle, or into the cups.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A combination food cutting board with removable compartments, comprising:
    a lower base including a primary materials receptacle, a plurality of secondary lower apertures, and a storage container;
    an upper planar cutting board configured to removably mate with the lower base, the upper planar cutting board having an upper cutting surface defining a primary aperture aligned with the primary materials receptacle, and a plurality of secondary apertures configured to be aligned with the plurality of secondary lower apertures of the lower base, respectively, said storage compartment of said lower base being configured to be concealed under the upper planar cutting board when said upper planar cutting board is removably mated with the lower base; and
    a plurality of cups configured to be removably received in the plurality of secondary apertures of the upper planar cutting board and the plurality of secondary lower apertures of the lower base, said plurality of cups having upper edges;
    said plurality of cups being configured to be removably received in the plurality of secondary apertures of the upper planar cutting board when said plurality of secondary apertures of the upper planar cutting board and the plurality of secondary lower apertures of the lower base are aligned, wherein said plurality of secondary apertures defined in the upper cutting surface of the planar cutting board are flush with the upper edges of said plurality of cups when the plurality of cups are removably received in the upper planar cutting board and lower base, and wherein the plurality of cups each have a handle that projects above the cutting board surface when the plurality of cups are removably received in the plurality of secondary apertures of the upper planar cutting board and the plurality of secondary lower apertures of the lower base.

2. The combination food cutting board of claim 1, wherein said primary materials receptacle of said lower base comprises a lateral opening, and further comprising a drawer slidably received in the primary materials receptacle of the lower base through said lateral opening.

3. The combination food cutting board of claim 2, wherein said drawer comprises a handle configured to project outwardly from said lateral opening when said drawer is slidably received in the base primary materials receptacle.

4. The combination food cutting board of claim 1, wherein said lower base includes a plurality of upwardly directed dowel pins, said upper planar cutting board includes a lower surface opposing said upper cutting surface, and said lower surface of the upper planar cutting board includes a corresponding plurality of apertures for receiving the upwardly directed dowel pins of the lower base, for aligning and removably mating the upper planar cutting board with the lower base.

5. The combination food cutting board of claim 1, wherein said plurality of secondary lower apertures in said lower base are round, said plurality of secondary apertures in said upper planar cutting board are round, and said plurality of cups are round.

6. The combination food cutting board of claim 1, further comprising a scoop configured to cooperate with said upper planar cutting board for moving cut food and waste from said upper planar cutting board, and wherein said scoop is configured to be stored in said storage compartment.

7. The combination food cutting board of claim 2, wherein said lower base includes a plurality of upwardly directed dowel pins, said upper planar cutting board includes a lower surface opposing said upper cutting surface, and said lower surface of the upper planar cutting board includes a corresponding plurality of apertures for receiving the upwardly directed dowel pins of the lower base, for aligning and removably mating the upper planar cutting board with the lower base.

8. The combination food cutting board of claim 2, wherein said plurality of secondary lower apertures in said lower base are round, said plurality of secondary apertures in said upper planar cutting board are round, and said plurality of cups are round.

* * * * *